United States Patent

[11] 3,626,249

[72] Inventor Marion L. Snedeker
 Cleveland, Ohio
[21] Appl. No. 18,961
[22] Filed Mar. 12, 1970
[45] Patented Dec. 7, 1971
[73] Assignee Victoreen Leece Neville, Inc.
 Cleveland, Ohio

[54] TRANSIENT VOLTAGE PROTECTION CIRCUIT
 15 Claims, 1 Drawing Fig.
[52] U.S. Cl. .................................................. 317/16,
 317/31, 317/50, 307/93, 307/100
[51] Int. Cl. ...................................................... H02h 3/22
[50] Field of Search ........................................... 317/16, 31,
 50, 33; 307/93, 100; 320/DIG. 2; 323/22 SC

[56] References Cited
 UNITED STATES PATENTS
3,048,718 8/1962 Starzec .................. 307/93
3,393,347 7/1968 Webb ..................... 317/31
3,407,335 10/1968 Hartung ................. 317/16
3,487,284 12/1969 Cady ..................... 320/20
3,493,838 2/1970 Gyugi .................... 323/22 SC Primary Examiner—J. D. Miller
Assistant Examiner—Harvey Fendelman
Attorney—Yount and Tarolli ABSTRACT: A transient voltage protection circuit protects electronic devices coupled across a DC voltage source from transient voltages. A voltage breakdown device is employed to sense the voltage transients which appear across the voltage source. The voltage breakdown device is connected across the collector and the base junctions of a control transistor. A transient voltage above a predetermined magnitude will cause the voltage breakdown device to switch into impedance state thereby turning on the control transistor. The current flowing through the collector-emitter path of the control transistor is supplied as a control current to the bases of two parallel-connected shunting transistors which are driven into saturation when the control transistor is turned on. The shunting transistors are in a low impedance path across the source which includes a current limiting resistor and which loads the transient voltage in order to reduce its peak amplitude. When the shunting transistors are turned on, the voltage across the control transistor and the voltage breakdown device is reduced and the circuit elements are reset.

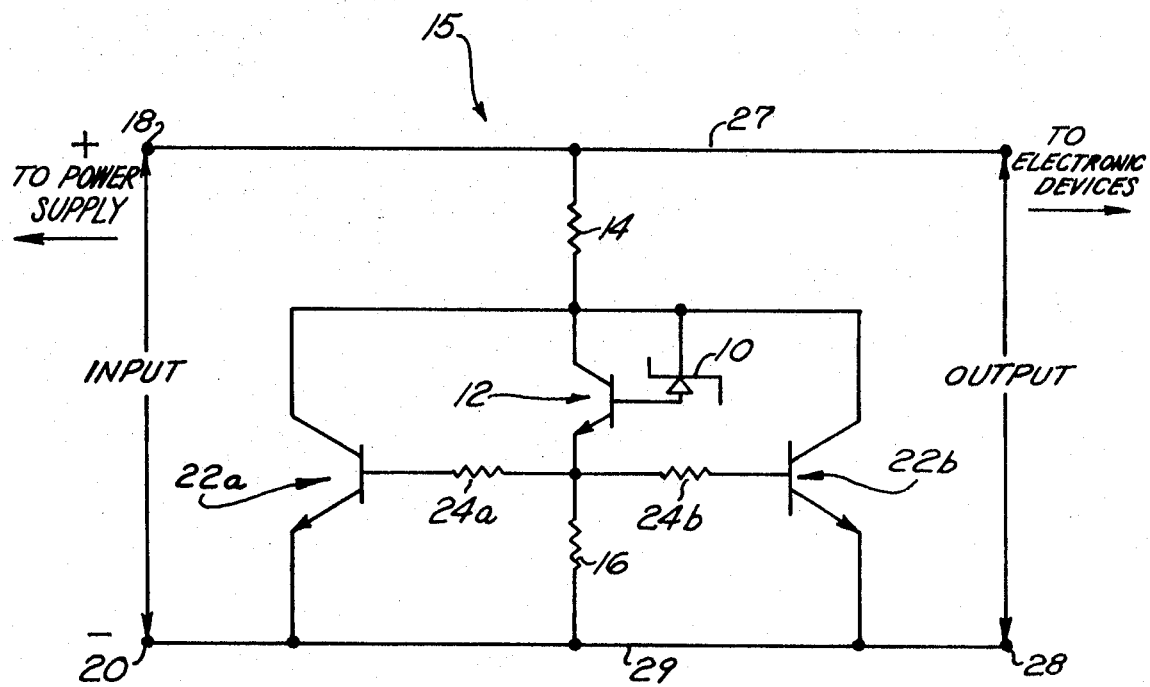

TRANSIENT VOLTAGE PROTECTION CIRCUIT

The present invention relates to transient voltage protection circuits for the protection of electronic devices connected across a DC voltage source. Transient voltage protection circuits are known which have either a quiescent current flowing therethrough or which require some means for resetting the circuit after they have shunted a transient voltage from the protected devices. An example of such circuits may be found in U.S. Pat. No. 3,423,635 issued on an application of James E. Moe on Jan. 21, 1969; and U.S. Pat. No. 3,407,335 issued on an application of Edward C. Hartung on Oct. 22, 1968.

It is an object of the present invention to provide a new and improved transient voltage protection circuit for protecting electronic devices connected across a DC voltage source wherein the protection circuit does not require a means for resetting after it has loaded a transient voltage to reduce its peak amplitude and the protection circuit draws no appreciable amount of quiescent current.

It is another object of the present invention to provide a new and improved transient protection circuit in which a voltage breakdown device is connected in the base circuit of a control transistor which is turned on to render one or more shunting transistors conductive, the circuit being such that the overvoltage rating of the breakdown device may be minimized.

It is a further object of the present invention to provide a transient protection circuit employing a Zener diode in which transient limiting may be accomplished over a wide range of voltages by employing Zener diodes with different breakdown voltages.

It is also an object of the present invention to provide a transient voltage protection circuit for protecting electronic devices connected across a DC voltage source wherein a circuit comprising a transistor, or paralleled transistors, is connected in shunt across the voltage source, a control transistor has its collector-emitter path coupled between the collectors and the bases of the shunting transistors to supply turn on current to the shunting transistors, a voltage breakdown device is connected between the base and the collector of the control transistor so that the control transistor is turned on when a transient voltage which exceeds a predetermined amount appears across the voltage source and the voltage breakdown device switches to its low-impedance state, the transient voltage being loaded through the low-resistance collector-emitter path of the shunting transistors in series with a current limiting resistor to reduce the peak amplitude of the transient voltage and the transistors and the voltage breakdown device all revert to a high impedance state when the transient voltage has been dissipated so that no appreciable amount of quiescent current flows through the protection circuit.

Further objects and advantages of the present invention will be apparent to those skilled in the art to which the present invention relates from the following description of a preferred embodiment thereof made with reference to the accompanying FIGURE which is a schematic of the transient voltage protection circuit.

In an electrical apparatus which employs semiconductor devices, transient voltages which exceed a predetermined voltage will permanently damage the semiconductor devices if they are applied to them. The present invention provides a protection circuit for protecting semiconductor devices which are connected across a DC voltage source by causing the transient voltages to be greatly reduced in amplitude. The transient voltage protection circuit of the present invention is particularly advantageous in that no appreciable quiescent power is drawn from the DC voltage source by the protection of the circuit since the only quiescent current is the negligible leakage current of the semiconductor elements of the circuit. In addition, the circuit is automatically restored to a nonconducting, voltage-sensing condition following the loading of a transient voltage to reduce its peak amplitude.

The FIGURE shows an embodiment of the present invention in which semiconductor devices, or other electronic devices (not shown) are connected to conductors 27, 29 which extend from the DC voltage source (not shown). The semiconductor devices are protected from a transient voltage by a protection circuit 15 which is connected between the conductors 27, 29 and which loads the transient voltage appearing across the conductors 27, 29 so that its peak amplitude is reduced.

The protection circuit 15 includes a voltage-transient sensing element which is preferably a voltage breakdown device such as a Zener diode 10. By selection of Zener diodes having various Zener breakdown voltages, transient limiting may be achieved with the circuit of the present invention over a wide range of voltages. This gives the circuit considerable flexibility in transient limiting applications.

The Zener diode 10 is normally in a high impedance, nonconductive state and it is connected across the conductors 27, 29 in series with the resistor 14, the base-emitter path of a control transistor 12 and a resistor 16. When a transient voltage exceeding a predetermined magnitude appears across the conductors 27, 29, the breakdown voltage of the Zener diode 10 is exceeded and it switches to its low impedance state. When the Zener diode 10 is in its low impedance state it turns on the control transistor 12.

When the control transistor 12 is turned on, it in turn turns on shunting transistors 22a and 22b which have their collector-emitter paths connected to the emitter of the control transistor 12 through resistors 24a and 24b, respectively, and to the conductor 29. The resistor 16, which is connected between the emitter of the control transistor 12 and the conductor 29, is employed to develop a voltage for turning on the shunting transistors 22a and 22b. When a transient voltage appears across load conductors 27, 29, the Zener diode will break down to turn on the control transistor 12 which in turn, turns on the shunting transistors 22a, 22b to provide a low impedance path across the conductors 27, 29 which is current limited by resistor 14 to provide a shunt path for the transient voltage in order to protect the electronic devices that are connected across the conductors 27, 29. Dissipation of the transient voltage across the conductors 27, 29 is accomplished by resistor 14 and the conductive transistors 22a, 22b.

The Zener diode 10 preferably breaks down at a voltage a little greater than normal system voltage. It will be noted that the circuit configuration of the protection circuit is such that the Zener diode 10 is not required to withstand high over voltages. When the Zener diode 10 breaks down, the conduction of the control transistor 12 established a low voltage drop across the Zener diode 10 regardless of the magnitude of the transient voltage. When the control transistor 12 and the shunting transistors 22a, 22b are turned on, the voltage drop across the Zener diode 10 will drop below the extinguishing voltage for the Zener diode 10 and it will become nonconductive. It will be noted that when the shunting transistors 22a, 22b, the control transistor 12 and the Zener diode 10 are in their nonconductive state, they only draw a negligible leakage current from the power supply.

The resistors 24a and 24b are equalizing resistors which cause the transistors 22a and 22b to equally share the control current that is supplied by the control transistor 12. A single shunting transistor could be employed, with its base connected to the emitter of the control transistor 12, if the current carrying capability and the current gain of the single shunting transistor were adequate to satisfactorily load down the transient voltage.

Although the present invention has been described with reference to an embodiment thereof, it is to be understood that other embodiments and variations of the present invention will be apparent to those skilled in the art and it is intended that these be included within the scope of the appended claims.

What is claimed is:

1. A transient voltage protection circuit for protecting electronic devices connected across a DC voltage source from transient voltages, comprising voltage-transient sensing means for sensing a transient voltage above a predetermined magnitude and loading means having an inactive high impedance, nonconductive state and an active low impedance, conductive state connected across said source, and control means responsive to said sensing means for switching said loading means into its active state to effect loading of the transient voltage when said transient voltage exceeds said predetermined magnitude so as to reduce the peak amplitude of said transient voltage, said loading means being constructed to load said transient voltage until after said transient voltage has been dissipated, and current limiting means connected in series with both said loading means and said control means across said DC voltage source.

2. A transient voltage protection circuit for protecting electronic devices as defined in claim 1 wherein said loading means includes at least one transistor that has its collector-emitter path coupled in series with said current limiting means in a loading path across the DC voltage source.

3. A transient voltage protection circuit for protecting electronic devices as defined in claim 1 wherein the voltage-transient sensing means is a voltage-breakdown device having a quiescent high impedance, nonconductive state so that no appreciable quiescent current flows through the protection circuit, said voltage breakdwon means being switched to a low impedance, conductive state when said transient voltage exceeds said predetermined magnitude.

4. A transient voltage protection circuit for protecting electronic devices as defined in claim 3 wherein said loading means includes at least one transistor that has its collector-emitter path coupled in series with said current limiting means in a loading path across the DC voltage source.

5. A transient voltage protection circuit for protecting electronic devices connected across a DC voltage source from transient voltage, comprising voltage-transient sensing means for sensing a transient voltage above a predetermined magnitude, and circuit means connected across said DC voltage source, said circuit means comprising control means controlled by said sensing means for developing a control signal when the transient voltage exceeds said predetermined magnitude and loading means having an inactive high impedance, nonconductive state and an active low impedance, conductive state, said loading means being switched into its active state in response to a said control signal to effect loading of a transient voltage by the said loading means when said transient voltage exceeds said predetermined magnitude so as to reduce its peak amplitude, said control means and said loading means being constructed to load said transient voltage until after said transient voltage has been dissipated, and current limiting means connected in series with both said loading means and said control means across said DC voltage source.

6. A transient voltage protection circuit for protecting electronic devices as defined in claim 5 wherein said loading means includes at least one transistor that has its collector-emitter path coupled in a loading path in series with said current limiting means across the DC voltage source.

7. A transient voltage protection circuit for protecting electronic devices as defined in claim 5 wherein the voltage-transient sensing means is a voltage breakdown device so that no quiescent current flows through the protection circuit, said voltage breakdown means being switched to a low impedance, conductive state when said transient voltage exceeds said predetermined magnitude.

8. A transient voltage protection circuit for protecting electronic devices as defined in claim 7 wherein said loading means includes at least one transistor that has its collector-emitter path coupled in a loading path in series with said current limiting means across the DC voltage source.

9. A transient voltage protection circuit for protecting electronic devices as defined in claim 7 wherein the voltage breakdown device is a two-terminal device and the control means is a transistor which has its base connected to one terminal of the voltage breakdown device and its collector connected to the other terminal of the voltage breakdown device.

10. A transient voltage protection circuit for protecting electronic devices as defined in claim 9 wherein said loading means includes at least one transistor that has its collector-emitter path coupled in series with said current limiting means in a loading path across the DC voltage source and its base coupled to the emitter of the control transistor.

11. A transient voltage protection circuit for protecting electronic devices across a DC voltage source having a first terminal and a second terminal, comprising a first resistance element connected to the first terminal of the voltage source, a control transistor having its collector-emitter path coupled in series with the first resistance element, a second resistance element connected between the emitter of the control transistor and the second terminal of the voltage source, a two-terminal voltage breakdown device connected between the collector and the base of the control transistor; and at least one loading transistor having its collector connected to the collector of the control transistor and having its collector emitter path in series with said first resistance, its emitter connected to the second terminal of the DC voltage source and its base coupled through a low resistance path to the emitter of the control transistor; the voltage breakdown device, the control transistor and the loading transistors all having an inactive high impedance, nonconductive state and an active low impedance, conductive state and all being switched into their active states to effect the loading of a transient voltage across said first and second terminals which exceeds said predetermined magnitude so as to reduce the peak amplitude of said transient voltage; said voltage breakdown means, said control transistor and said loading transistor all being constructed to load said transient voltage until after said transient voltage has been dissipated.

12. A transient voltage protection circuit for protecting electronic devices as defined in claim 11 wherein the voltage breakdown means is a Zener diode.

13. A transient voltage protection circuit for protecting electronic devices as defined in claim 11 wherein two or more loading transistors are coupled in parallel with each other and have their bases coupled to the emitter of the control transistor through equalizing resistors.

14. A transient voltage protection circuit for protecting electronic devices as defined in claim 13 wherein the voltage breakdown means is a Zener diode.

15. A transient voltage protection circuit for protecting electronic devices connected across a DC voltage source from transient voltages, comprising voltage transient sensing means for sensing a transient voltage above a predetermined magnitude, current limiting means, and loading circuit means including semiconductor switch means, said current limiting means being connected in series with both said switch means and said sensing means across said DC voltage source, said switch means exhibiting the characteristic of having a normal nonconductive high impedance condition and a conductive low impedance condition when said sensing means senses a said transient voltage to thereby load said transient voltage until after said transient voltage has been dissipated.

* * * * *